US011698922B2

United States Patent
Pedersen

(10) Patent No.: US 11,698,922 B2
(45) Date of Patent: Jul. 11, 2023

(54) CLASSIFICATION AND MODERATION OF TEXT

(71) Applicant: Valve Corporation, Bellevue, WA (US)

(72) Inventor: Morten Pedersen, Kirkland, WA (US)

(73) Assignee: Valve Corporation, Bellevue, WA (US)

( * ) Notice: Subject to any disclaimer, the term of this patent is extended or adjusted under 35 U.S.C. 154(b) by 1287 days.

(21) Appl. No.: 16/179,781

(22) Filed: Nov. 2, 2018

(65) Prior Publication Data

US 2020/0142999 A1    May 7, 2020

(51) Int. Cl.
  *G06N 20/00*      (2019.01)
  *G06F 16/338*     (2019.01)
  (Continued)

(52) U.S. Cl.
  CPC ............ G06F 16/338 (2019.01); G06F 16/35 (2019.01); G06F 18/214 (2023.01);
  (Continued)

(58) Field of Classification Search
  CPC ..... G06F 16/35; G06F 16/338; G06K 9/6218; G06K 9/6256; G06K 9/6263; G06N 20/00; G06Q 10/107
  See application file for complete search history.

(56) References Cited

U.S. PATENT DOCUMENTS

| | | | |
|---|---|---|---|
| 2012/0150997 A1* | 6/2012 | McClements, IV | ........................ G06Q 10/101 709/217 |
| 2013/0151443 A1 | 6/2013 | Kyaw et al. | |

(Continued)

FOREIGN PATENT DOCUMENTS

| | | | |
|---|---|---|---|
| WO | WO2017162919 | 9/2017 | |
| WO | WO-2017162919 A1 * | 9/2017 | ........... G06F 16/353 |

OTHER PUBLICATIONS

Djuric et al., "Hate Speech detection with comment embeddings", retrieved on Dec. 22, 2019 at <<http://citeseerx.ist.psu.edu/viewdoc/download?doi=10.1.1.697.9571&rep=rep1&type=pdf>>, In Proceedings of the 24th international conference on world wide web, ACM, May 18, 2015, pp. 29-30.

PCT Search Report and Written Opinion dated Jan. 21, 2020 for PCT Application No. PCT/US2019/059254, 11 pages.

(Continued)

*Primary Examiner* — John W Lee
(74) *Attorney, Agent, or Firm* — Lee & Hayes, P.C.

(57) ABSTRACT

Disclosed herein are techniques and systems for classifying and moderating text using a machine learning approach that is based on a word embedding process. For instance, word embedding vectors may be used to determine clusters of associated text (e.g., similar words) from a corpus of comments maintained by a remote computing system. The remote computing system may then identify, within the corpus of comments, a subset of comments that include text from a given cluster that was determined, from human labeling input, to include a particular type of word or speech. Using this information, the corpus of comments may be labeled with one of multiple class labels. A machine learning model(s) may be trained to classify text as one of the multiple class labels using a sampled set of labeled comments as training data. At runtime, text can be moderated based on its class label.

20 Claims, 9 Drawing Sheets

(51) Int. Cl.
*G06F 16/35* (2019.01)
*G06F 18/23* (2023.01)
*G06F 18/214* (2023.01)
*G06F 18/21* (2023.01)

(52) U.S. Cl.
CPC .......... *G06F 18/2178* (2023.01); *G06F 18/23* (2023.01); *G06N 20/00* (2019.01)

(56) References Cited

U.S. PATENT DOCUMENTS

| | | | |
|---|---|---|---|
| 2013/0204885 A1* | 8/2013 | Clinchant | G06V 30/18152 707/E17.073 |
| 2014/0272822 A1* | 9/2014 | Yang | G09B 19/00 434/167 |
| 2017/0322923 A1 | 11/2017 | Dixon et al. | |
| 2018/0121785 A1* | 5/2018 | Min | G06N 3/006 |

OTHER PUBLICATIONS

Vandermissen, "Automated detection of offensice language behavior on social networking sites", retrieved on Dec. 22, 2019 at <<https://lib.ugent.be/fulltxt/RUG01/001/887/239/RUG01-001887239_2012_0001_AC.pdf>>, Universiteit Gent, Faculteit Ingenieurswetenschappen en Architectuur, Master Thesis, Jun. 2012, 100 pages.

Extended European Search Report dated Jul. 1, 2022 for European Patent Application No. 19878626.1, 8 pages.

* cited by examiner

CLASSIFICATION AND MODERATION OF TEXT

BACKGROUND

Service providers utilizing network-accessible platforms often allow users to exchange user-generated content with other users of the platform. For example, a video game service provider, which provides a platform for users to access a large collection of video games, may also allow registered users to post comments to an online message board and/or participate in chat sessions with other users (e.g., while playing a video game).

Although the vast majority of user-generated content is appropriate for consumption by the user community, there is often a small population of users who author inappropriate content. For instance, some users might post comments that contain toxic language, hate speech, and/or profanity, which are typically deemed offensive and/or inappropriate for consumption by the average user. When users engage in this type of bad behavior, the user experience for the vast majority of users who want to engage in appropriate behavior is degraded.

Human moderators cannot moderate user-generated content effectively when the user community is large. Furthermore, although automated approaches have been developed to censor inappropriate content before it is seen by other users, creative users will often find ways to circumvent these automated detection systems, such as by intentionally misspelling words (e.g., misspelled profanity, hate speech, etc.) or using symbols in lieu of letters of the alphabet to disguise toxic language while still conveying its meaning to viewing users. The disclosure made herein is presented with respect to these and other considerations.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
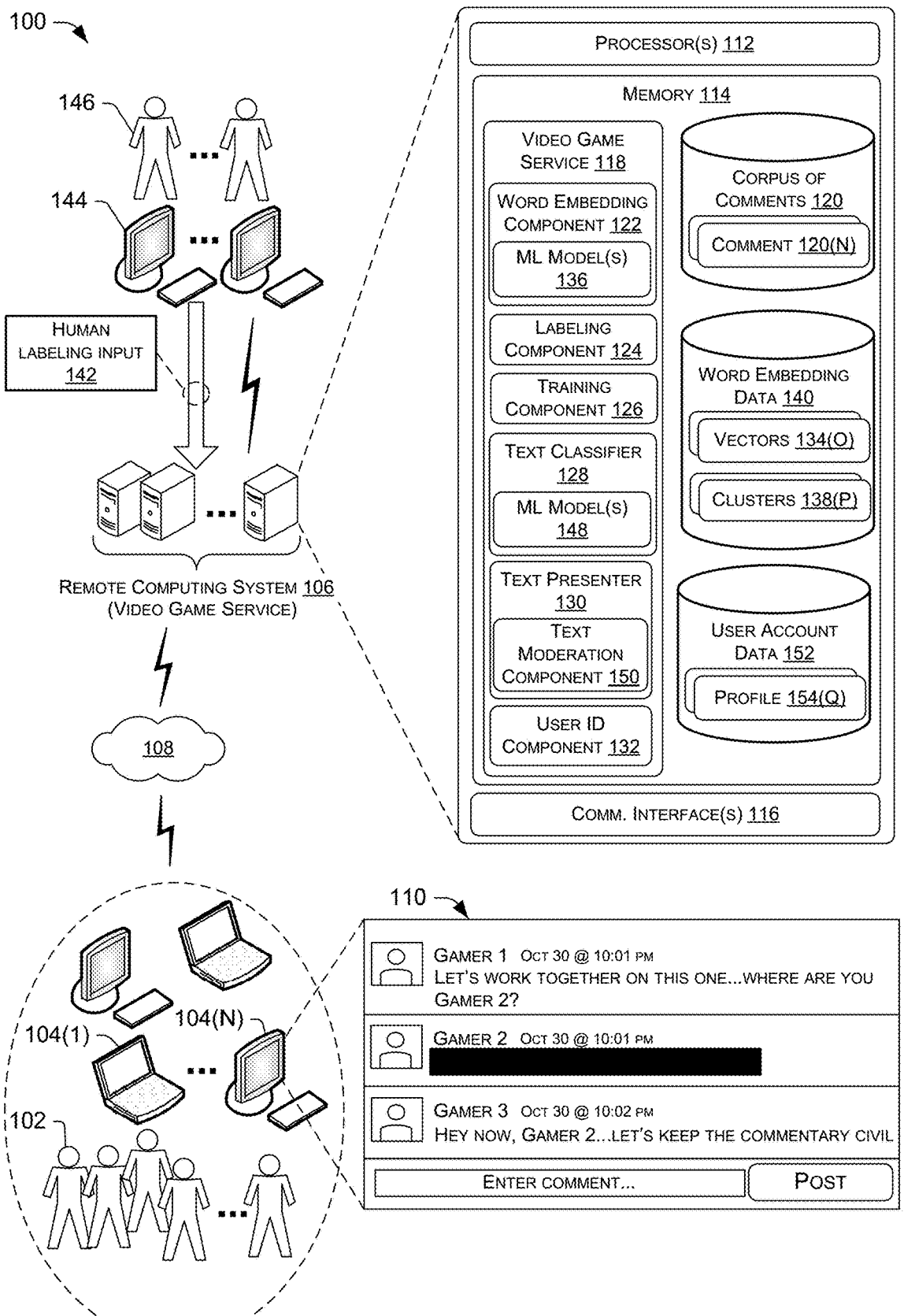
FIG. 1 is a diagram illustrating an example environment that includes a remote computing system configured to classify text and to moderate text, as appropriate, before it is presented on a client machine(s) of a consuming user(s). The classification of text may use a machine learning approach that is based on a word embedding.

Described herein are, among other things, techniques, devices, and systems for classifying text and, based on its classification, moderating the text, as appropriate, before the text is presented on a client machine(s) of a user(s). Text may be classified using a machine learning approach that is based on a word embedding process. After the text is classified, the text assigned to a certain class label(s) can be moderated so that one or more classes of text are not seen by an audience who may not want to see that type of speech. For example, toxic language may be considered offensive to most users, and the techniques and systems disclosed herein may allow for classifying text as "toxic" or "non-toxic," and moderating text classified as toxic so that users do not see toxic language in the text that is rendered on their computer screen. It is to be appreciated, however, that the techniques and systems disclosed herein can be extended to any class of text for moderating text of any type of speech. In addition, individual users can define categories of speech that they do not want to see, and text moderation can be carried out on a per-user basis to customize the text moderation for individual users.

The disclosed techniques may be implemented, at least in part, by a remote computing system that provides a network-accessible platform where users can exchange user-generated content, such as text. For instance, the remote computing system may be configured to receive comments generated by users (e.g., messages that are to be sent to other users, comments that are to be posted to an online message board, etc.). Because the comments received by the remote computing system are user-generated, they are inherently unclassified upon receipt at the remote computing system. Over time, the remote computing system may collect a large corpus of comments, which can be used to create a word embedding that maps text found in the corpus of comments to word embedding vectors. In some embodiments, these word embedding vectors can be of a relatively high dimension (e.g., 300-dimensional embedding vectors). The word embedding vectors can then be used to determine clusters of associated text (e.g., similar words that can be grouped together).

With these clusters of associated text, the computing system may determine, based on human labeling input, that a portion of text within a given cluster is a particular type of word or speech (e.g., that a word in a given cluster represents toxic language, profanity, hate speech, etc.). The computing system may then identify, within the corpus of comments, a subset of comments that include text from the given cluster, and may label the comments within the corpus of comments appropriately based on the identified subset. For example, the identified subset of comments may be labeled with a first class label (e.g., "toxic") of multiple class labels, while remaining comments may be labeled with a second class label (e.g., "non-toxic") of the multiple class labels. A machine learning model(s) can then be trained using a sampled set of labeled comments to obtain a trained machine learning model(s) that is configured to classify text as one of the multiple class labels. Subsequently, when the computing system receives unclassified, user-generated text that is to be presented on one or more client machines, the computing system may provide the unclassified text as input to the trained machine learning model(s), and may generate, as output from the trained machine learning model(s), a classification of the unclassified text as one of the multiple class labels. Any text that is classified as the first class label can be moderated (e.g., concealed) when that text is presented on a display(s) of the client machine(s).

The techniques and systems described herein may provide an improved user experience for users of any network-accessible platform that allows its users to exchange user-generated content. This is because text that falls into certain types/classes of speech considered to be offensive (e.g., toxic language/speech) can be moderated so that it is not seen by users who may be offended by that text. The techniques and systems are also very flexible, as compared to existing automated approaches for moderating text. This is because the techniques described herein for associating text is based on a word embedding process, which does not require the system to develop an understanding of the semantic meaning of the text in order to determine clusters of associated text. This means that efforts to circumvent the text classification system will be ineffective due to the system's ability to dynamically adapt to changing user behavior in terms of the creation of user-generated content. For instance, the techniques and systems disclosed herein are flexible enough to detect creative misspellings of words that are known to be inappropriate or offensive, or text that substitutes symbols for letters of the alphabet as an attempt to circumvent the classification system and still convey the intended semantic meaning to consuming users of the text.

It is to be appreciated that, although many of the examples described herein reference the classification and moderation of text that pertains to inappropriate language or speech (e.g., toxic language, profanity, and/or hate speech), the techniques and systems described herein may be configured to classify and moderate text of any type/class of speech, and the system is also customizable so that text can be moderated for individual users based on their own preferences for moderating text.

FIG. 1 is a diagram illustrating an example environment 100 that includes a remote computing system configured to classify text and to moderate text, as appropriate, before the text is presented on a client machine(s) of a user(s). The classification of text may use a machine learning approach that is based on a word embedding process, as is described in more detail below.

A community of users 102 may be associated with one or more client machines 104. The client machines 104(1)-(N) (collectively 104) shown in FIG. 1 represent computing devices that can be utilized by users 102 to execute programs thereon. These programs may include text composition and messaging programs including, without limitation, client applications and/or web browsers that provide access to a remote computing system 106. In some embodiments, one or more of these applications allow the client machines 104 to download and/or execute video game programs for execution thereon. The client machines 104 can be implemented as any suitable type of computing device configured to execute programs and to render graphics, including text, on an associated display. For example, a client machine 104 may include, without limitation, a personal computer (PC), a desktop computer, a laptop computer, a mobile phone (e.g., a smart phone), a tablet computer, a portable digital assistant (PDA), a wearable computer (e.g., virtual reality (VR) headset, augmented reality (AR) headset, smart glasses, etc.), an in-vehicle (e.g., in-car) computer, a television (smart television), a set-top-box (STB), a game console, and/or any similar computing device. Furthermore, the client machines 104 may vary in terms of their respective platforms (e.g., hardware and software). For example, the plurality of client machines 104 shown in FIG. 1 may represent different types of client machines 104 with varying capabilities in terms of processing capabilities (e.g., central processing unit (CPU) models, graphics processing unit (GPU) models, etc.), graphics driver versions, and the like, The client machines 104 may communicate with a remote computing system 106 (sometimes shortened herein to "computing system 106," or "remote system 106") over a computer network 108. The computer network 108 may represent and/or include, without limitation, the Internet, other types of data and/or voice networks, a wired infrastructure (e.g., coaxial cable, fiber optic cable, etc.), a wireless infrastructure (e.g., radio frequencies (RF), cellular, satellite, etc.), and/or other connection technologies. The computing system 106 may, in some instances be part of a network-accessible computing platform that is maintained and accessible via the computer network 108. Network-accessible computing platforms such as this may be referred to using terms such as "on-demand computing", "software as a service (SaaS)", "platform computing", "network-accessible platform", "cloud services", "data centers", and so forth.

In some embodiments, the computing system 106 acts as, or has access to, a video game platform that implements a video game service to distribute (e.g., download, stream, etc.) video games (and content associated therewith) to the client machines 104. In an example, the client machines 104 may each install a client application thereon. The installed client application may be a video game client (e.g., gaming software to play video games). A client machine 104 with an installed client application may be configured to download, stream, or otherwise receive programs (e.g., video games) from the computing system 106 over the computer network 108. Any type of content-distribution model can be utilized for this purpose, such as a direct purchase model where programs (e.g., video games) are individually purchasable for download and execution on a client machine 104, a subscription-based model, a content-distribution model where programs are rented or leased for a period of time, streamed, or otherwise made available to the client machines 104. Accordingly, an individual client machine 104 may include one or more installed video games that are executable by loading the client application.

The installed client application, and/or a generic web browser, may also enable messaging functionality via the remote computing system 106 for the users 102 of the client machines 104 who are registered with a service(s) provided by the remote computing system 106. For example, the remote computing system 106 may implement various forms of online discussion forums, such as the example online discussion forum 110 presented on the client machine 104 (N) in FIG. 1. The online discussion forum 110 allows users 102 to exchange user-generated content, including text, with each other. The online discussion forum 110 shown in FIG. 1 is merely an example representation, and the remote computing system 106 may be configured to implement any suitable type of online discussion forum 110 for its users 102, such as, without limitation, a message board, a bulletin board, a customer review site, a blog site, a social networking site, a messaging application for in-game chat sessions (e.g., chat sessions between users 102 during execution of a video game on respective client machines 104 of those users 102), and/or other suitable types of online discussion forums. In any of these online discussion forums, users 102 may author, compose, generate, or otherwise create content of their own, including text, that can be sent to the remote computing system 106 for posting the user-generated content in the online discussion forum, thereby making the user-generated content accessible/viewable to one or more other users 102. For example, users 102 can compose messages by entering free form text into text entry fields, and those messages can be sent, via the remote system 106 and made available to one or more other users 102 (e.g., using direct, one-on-one chat sessions, group chat sessions, posting comments to message boards, etc.).

FIG. 1 shows a block diagram illustrating example components of the remote computing system 106. In the illustrated implementation, the computing system 106 includes, among other components, one or more processors 112 (e.g., a central processing unit(s) (CPU(s))), memory 114 (or non-transitory computer-readable media 114), and a communications interface(s) 116. The memory 114 (or non-transitory computer-readable media 114) may include volatile and nonvolatile memory, removable and non-removable media implemented in any method or technology for storage of information, such as computer-readable instructions, data structures, program modules, or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The computer-readable media 114 may be implemented as computer-readable storage media ("CRSM"), which may be any available physical media accessible by the processor(s) 112 to execute instructions stored on the memory 114. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s) 112. A video game service 118 may represent instructions stored in the memory 114 that, when executed by the processor(s) 112, cause the computing system 106 to perform the techniques and operations described herein. A video game service 118 is provided as an illustrative example of executable instructions that may enable the functionality described herein, although any type of service other than a video game service may be configured with the functionality described herein, and it is to be appreciated that the techniques and systems disclosed herein are not limited implementation using a video game service 118.

As shown in FIG. 1, the computing system 106 may store a corpus of comments 120 that includes comments 120(1)-(N) (collectively 120) received from the client machines 104 over the network 108. These comments 120 may be maintained by the computing system 106 along with any suitable metadata (e.g., user account of the user 102 who posted the comment 120, a timestamp indicating a time when the comment 120 was posted, location data associated with the user account or the client machine 104 of the user 102 who posted the comment 120, etc.). In this manner, the corpus of comments 120 and the associated metadata is accessible to the remote computing system 106 at any given time. The corpus of comments 120 may be organized in any suitable manner, such based on the timestamps of the comments 120, which allows the system 106 to organize the comments chronologically. The comments 120 may include text (e.g., characters, words, phrases, etc.) and possibly other content (e.g., images, videos, etc.) that is searchable. The metadata may also be searchable. In this manner, comments 120 that contain particular text (e.g., words, phrases, etc.) and/or particular metadata can be identified using search queries. Over time, given a large community of users 102 that frequently interact with the video game platform, a large amount of comments 120 can be collected and maintained by the remote computing system 106. To give a sense of the magnitude, the corpus of comments 120 can include as many as 1 billion comments 120 (i.e., N≥1 billion).

As shown in FIG. 1, the video game service 118 may include a word embedding component 122, a labeling component 124, a training component 126, a text classifier 128, a text presenter 130, and a user identification (ID) component 132, among other possible components, some of which include subcomponents, as will be discussed in more detail below. The word embedding component 122 may be configured to create a word embedding from the corpus of comments 120. "Word embedding" is a collective name for a set of language modeling and feature learning techniques in natural language processing (NLP) where words or phrases from a vocabulary are mapped to vectors of real numbers, called "word embedding vectors" 134(1)-(O) (collectively 134). Word embedding generally involves a mathematical embedding from a space with one dimension per word to a continuous vector space with a much lower dimension. In the context of the present disclosure, the word embedding component 122 may be configured to map text (e.g., words) within the corpus of comments 120 to word embedding vectors 134. The text that is mapped to the word embedding vectors 134 may be, without limitation, words, n-grams, or any other suitable text item (e.g., phrases, sentences, documents, etc.). Furthermore, "words," as used herein, is not limited to grammatically-correct words that are found in a certified language dictionary. That is, a "word," as used herein, may include a misspelled word, or a combination of letters, numbers, and/or symbols that resembles, but is not, a real word. This is part of what makes the disclosed text classification system so flexible; it does not rely on understanding the semantics of "words" so that it can cluster word variants (e.g., fake words) with other words that have an established dictionary definition.

The word embedding component 122 may be further configured to provide the word embedding vectors 134 as input to a trained machine learning model(s) 136, and to determine, based on output from the trained machine learning model(s) 136, clusters of associated text 138(1)-(P) (often shortened to "clusters" 138). The trained machine learning model(s) 136 used by the word embedding component 122 may be trained to perform the following predictive task: given first text (e.g., a first word) and second text (e.g., a second word) in context (e.g., the second word within a certain number of spaces of the first word), predict whether the given text (e.g., the pair of words) belongs together or not. The text within each of the clusters 138 may include, without limitation, words, n-grams, phrases, sentences, documents, or any other unit of text. FIG. 1 shows word embedding data 140 that is generated by the word embedding component 122. Here, the word embedding data 140 includes, among other possible data, the aforementioned word embedding vectors 134 and the clusters of associated text 138.

In some embodiments, each word embedding vector 134 may be of a relatively high dimension, i, such as a 300-dimensional vector 134, which means that each piece of text (e.g., each word) in the corpus of comments 122 maps to i (e.g., i=300) features that are used by the trained machine learning model(s) 136 to predict clusters of associated text 138. In this manner, given a relatively large space of words and positions where the words can be placed, the trained machine learning model(s) 136 is trained to make accurate predictions as to text (e.g., words) that can be grouped together into the clusters 138. For instance, the trained machine learning model(s) 136 may be trained to place similar words together in similar positions/spots in the vector space, without requiring the machine learning model(s) 136 to develop an understanding of what those words actually mean from a semantics standpoint. In an illustrative example, the word embedding component 122 may cluster a word regarded as profanity (e.g., a correctly-spelled curse word) with variants of that word (e.g., misspellings of the curse word, variants of the curse word that replace letters with symbols and/or numbers). This makes the text classification framework extremely flexible in that the word embedding component 122 is capable of "catching" creative variants of a particular type of speech that would not otherwise be detected by a system that clusters text based on a semantic understanding of that text (e.g., a system that groups synonyms together).

The labeling component 124 may be configured to receive human labeling input 142. This human labeling input 142 may be provided to the remote computing system 106 via computing devices 144 of authorized users 146. Based on the human labeling input 142, the labeling component 124 can determine whether text (e.g., one or more words) in a given cluster 138 corresponds to a particular type of word and/or speech. For example, the authorized users 146 may be tasked with labeling curse words as "profanity," labeling offensive words as "hate speech," and/or labeling violent language as "toxic language," etc. These human-created labels are then used by the labeling component 124 as "seed" labels to identify the human-labeled words within particular clusters 138, and then propagate labels throughout the corpus of comments 120 by identifying comments that include words within the particular clusters 138. For example, the labeling component 124 may determine, from the human labeling input 142, that a particular word in a given cluster 138 represents "toxic" language, and, with this information, the labeling component 124 may identify, within the corpus of comments 120, a subset of comments 120 that include text (e.g., one or more words) from the cluster 138 that contains the particular word corresponding to toxic language. The labeling component 124 may then propagate that "toxic" label to the subset of comments 120 identified in the corpus of comments 120, while also labeling remaining comments with another label (e.g., non-toxic) to indicate that the remaining comments excluded from the subset do not contain toxic language. The names of the labels disclosed herein are merely exemplary, and any other naming convention can be utilized for the class labels. Furthermore, the human labeling input 142 may be used to label any type of speech, not just inappropriate or offensive speech. That is, any type/class of speech can be identified in the corpus of comments 120 as a type/class of speech to be moderated. For example, if the human labeling input 142 is used to identify a word relating to the topic of "food," the labeling component 124 may label comments that discuss "food" as a class label that is to be moderated so that one or more users 102 do not see comments 120 relating to the topic of food. As another example, human labeling input 142 may be used to identify text that is generated by "bots" and is regarded as spam (e.g., a hyperlink to a commercial site with text that attempts to entice users to click on the hyperlink). In this case, comments 120 that include spam can be moderated so that users 102 are not subjected to spam. In any case, after labeling, the corpus of comments 120 includes labeled comments 120.

The training component 126 may be configured to train a machine learning model(s) using a sampled set of the labeled comments 120 in the corpus of comments 120 as training data to obtain a trained machine learning model(s) 148. The trained machine learning model(s) 148 is usable by the text classifier 128 to classify text (e.g., comments including text) as one of multiple class labels. Machine learning generally involves processing a set of examples (called "training data") in order to train a machine learning model(s). A machine learning model(s), once trained, is a learned mechanism that can receive new data as input and estimate or predict a result as output. For example, a trained machine learning model can comprise a classifier that is tasked with classifying unknown input (e.g., an unknown image) as one of multiple class labels (e.g., labeling the image as a cat or a dog). In some cases, a trained machine learning model is configured to implement a multi-label classification task (e.g., labeling images as "cat," "dog," "duck," "penguin," and so on). In the context of the present disclosure, the trained machine learning model(s) 148 may receive unknown input in the form of unclassified text (e.g., a comment containing text authored by a user 102) that is to be presented on one or more client machines 104 (e.g., as part of an online discussion forum 110 accessible to client machines 104 of users 102), and, and the trained machine learning model(s) 148 may be tasked with classifying the unclassified text as one of multiple class labels. If the class labels relate to toxic language, a first class label might be "toxic," while a second class label might be "non-toxic." Additionally, or alternatively, a trained machine learning model can be trained to infer a probability, or a set of probabilities, for a classification task based on unknown data received as input. In the context of the present disclosure, the unknown input may, again, be unclassified text that is to be presented on a display of a client machine(s) 104, and the trained machine learning model(s) 148 may be tasked with outputting a score that indicates, or otherwise relates to, a probability of the text belonging to one of multiple classes. For instance, the score may relate to a probability of an unclassified comment received by the system 106 including text that is considered to be toxic language. In some embodiments, a score output by the trained machine learning model 148 is a variable that is normalized in the range of [0,1], where a score of 1 might indicate text with a high probability of corresponding to a particular type/class of speech, and a score of 0 might indicate text with a low probability of corresponding to the particular type/class of speech. In some embodiments, the trained machine learning model(s) 148 may output a set of probabilities (e.g., two probabilities), or scores relating thereto, where one probability (or score) relates to the probability of the unclassified comment being classified as a first class label (e.g., toxic), and the other probability (or score) relates to the probability of the unclassified comment being classified as a second class label (e.g., non-toxic). A score that is output by the trained machine learning model(s) 148 can relate to either of these probabilities in order to influence the ultimate classification determination (e.g., if the score is above a threshold). In an example where a comment 120 includes profanity, the trained machine learning model(s) 148 may generate, as output, a classification of the comment as a first class label (e.g., "profanity") and/or a score that relates to a likelihood that the comment contains text classified as the first class label. Thus, the output of the machine learning model(s) 148 can, in some embodiments, indicate a level of confidence that the comment includes text of a particular type of speech or that the text includes a particular type of word.

The trained machine learning model(s) 136/148 may each represent a single model or an ensemble of base-level machine learning models, and may be implemented as any type of machine learning model. For example, suitable machine learning models for use with the techniques and systems described herein include, without limitation, neural networks, tree-based models, support vector machines (SVMs), kernel methods, random forests, splines (e.g., multivariate adaptive regression splines), hidden Markov model (HMMs), Kalman filters (or enhanced Kalman filters), Bayesian networks (or Bayesian belief networks), expectation maximization, genetic algorithms, linear regression algorithms, nonlinear regression algorithms, logistic regression-based classification models, or an ensemble thereof. An "ensemble" can comprise a collection of machine learning models whose outputs (predictions) are combined, such as by using weighted averaging or voting. The individual machine learning models of an ensemble can differ in their expertise, and the ensemble can operate as a committee of individual machine learning models that is collectively "smarter" than any individual machine learning model of the ensemble.

The machine learning model(s) described herein may be trainable using any suitable learning technique, such as supervised learning, unsupervised learning, semi-supervised learning, reinforcement learning, and so on. The features included in the training data can be represented by a set of features, such as in the form of an n-dimensional feature vector of quantifiable information about an attribute of the training data. As part of the training process, the training component 126 may set weights for machine learning. These weights may apply to a set of features included in the training data. In some embodiments, the weights that are set during the training process may apply to parameters that are internal to the machine learning model(s) (e.g., weights for neurons in a hidden-layer of a neural network). These internal parameters of the machine learning model(s) may or may not map one-to-one with individual input features of the set of features. The weights can indicate the influence that any given feature or parameter has on the score that is output by a trained machine learning model.

The text presenter 130 may be configured to serve (or otherwise send) text data to one or more client machines 104 in order to cause presentation of text on associated displays of the one or more client machines 104. For example, the text presenter 130 may send data to one or more client machines 104 via the network 108, the data being processed at the client machine 104 to cause presentation of a comment 120 (containing text) on a display of the client machine 104. A text moderation component 150 of the text presenter 130 may be configured to moderate text that has been classified as a particular class label(s) so that the text is not readily viewable on the display(s) of the client machine(s) 104. For example, the text moderation component 150 may be configured to moderate text of a particular class label by concealing the text in some manner. Moderating text may include, without limitation, rendering an opaque color (e.g., black color) over the text, blurring the text to render the text unreadable, omitting the text from a comment 120 that contains the text, or refraining from presenting the text on the display(s) of the client machine(s) 104, which may include refraining from sending the text data to the client machine 104 in the first place. As shown in FIG. 1, the online discussion forum 110 includes a comment from "Gamer 2" with text that has been moderated by rendering an opaque color over the text. In this manner, a user 102 of the client machine 104(N) is able to view comments 120 presented on the display of the client machine 104(N), but the user 102 is unable to see the moderated text that is concealed by an opaque color rendered over the moderated text.

The user ID component 132 may be configured to identify users 102 of client machines 104 accessing the video game service 118. The user ID component 132 may maintain user account data 152 for users 102, including data, such as credentials (e.g., user names, passwords, biometric data, etc.), which may be used to identify users 102. The user account data 152 may include user profiles 154(1)-(Q) (collectively 154). User preference settings may be maintained in association with the user profiles 154 to determine, on a per-user basis, the preferences of an individual user 102 in terms of the types of speech he/she would like moderated. For example, a user 102 may specify, via user preference settings, that he/she does not want to see comments 120 classified as toxic, hate speech, and/or profanity. These user preference settings are stored in association with the user profile 154 of the user 102, and the user preference settings may be used to determine whether to moderate text for a particular user 102. In general, the techniques and systems disclosed herein may provide an opt-in program where text is not moderated unless and until users 102 opt-in to have text that is to be presented them moderated. In some embodiments, the system may default to moderating certain classes of text deemed inappropriate for everyone in the user community, such as hate speech, leaving other classes of text or speech as opt-in choices so that a user can control how much text moderation they would like for the content that is displayed to them.

Although various components have been illustrated in FIG. 1 as being implemented by the remote computing system 106, it is to be appreciated that at least some of these components can be implemented on the client machines 104 for purposes of carrying out at least some of the functionality described herein. For example, client applications installed on each client machine 104 may include a text presenter 130 with a text moderation component 150 that is configured to control how text is moderated on the individual client machine 104 when text is presented on the display thereof.

Figure 2:
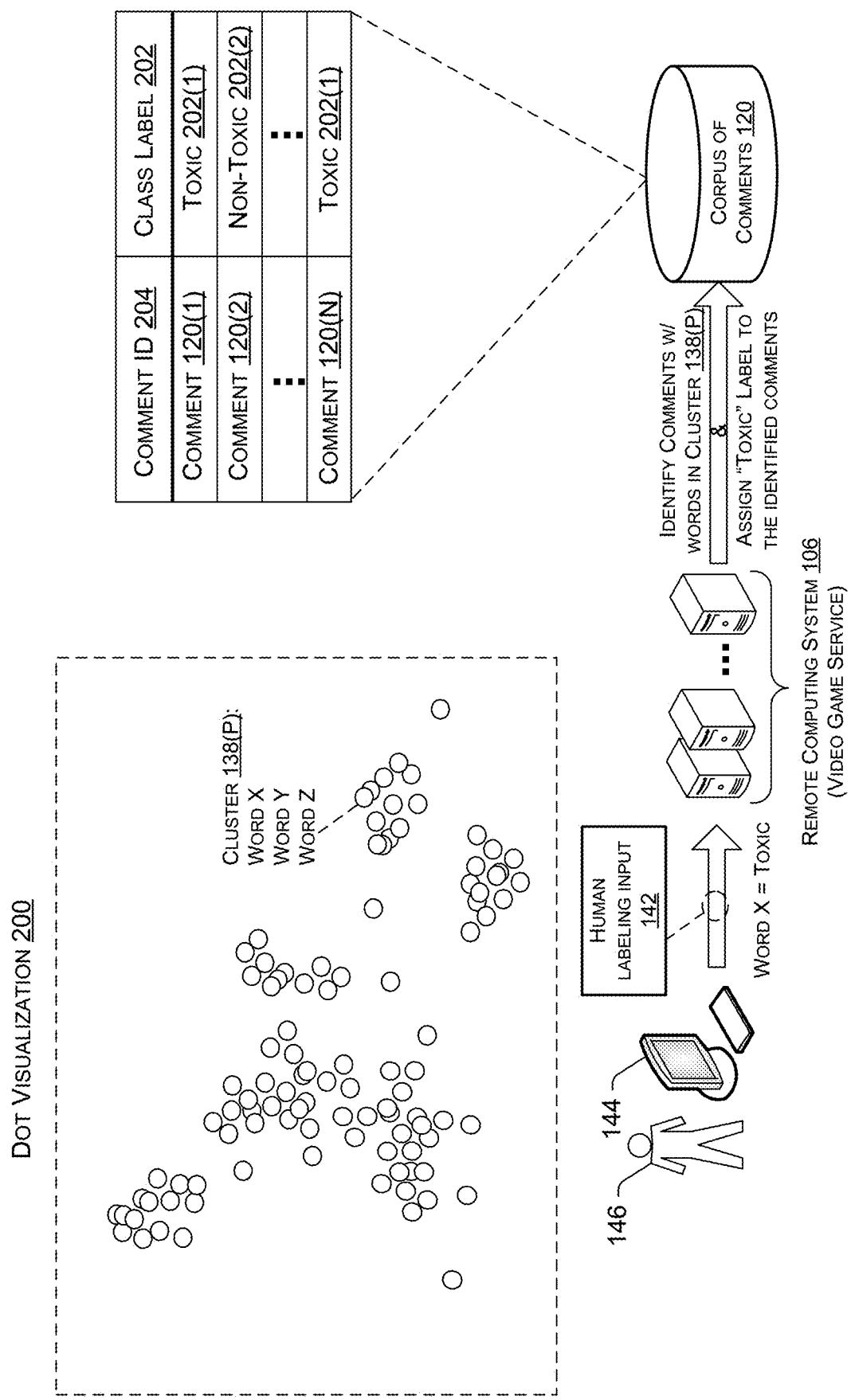
FIG. 2 is a diagram illustrating an example technique of using a word embedding to label a corpus of comments, the labeled comments usable to train a machine learning model(s) for classifying text.

FIG. 2 is a diagram illustrating an example technique of using a word embedding to label a corpus of comments 120, the labeled comments 120 being usable to train a machine learning model(s) 148 for classifying text. FIG. 2 shows a dot visualization 200 that represents a visualization of text (e.g., words) from the corpus of comments 120 after the word embedding component 122 has created a word embedding that maps text (e.g., words) from the corpus of comments 120 to word embedding vectors 134. The dot visualization 200 may represent a visualization of words (e.g., the top 10,000 words). This dot visualization 200 can be created using T-distributed Stochastic Neighbor Embedding (t-SNE). T-SNE is a machine learning algorithm for visualization, which is a nonlinear dimensionality reduction technique well-suited for embedding high-dimensional data for visualization in a low-dimensional space of two or three dimensions. In the context of the present disclosure, the dot visualization 200 models each i-dimensional (e.g., 300-dimensional) word embedding vector 134 by a two- or three-dimensional point so that similar vectors 134 are modeled by nearby points and dissimilar vectors are modeled by distant points with high probability. The t-SNE algorithm may comprise two main stages: First, a probability distribution is constructed over pairs of high-dimensional objects in such a way that similar objects have a high probability of being picked, whilst dissimilar points have an extremely small probability of being picked. Second, t-SNE defines a similar probability distribution over the points in the low-dimensional map, and it minimizes the Kullback-Leibler divergence between the two distributions with respect to the locations of the points in the map. In the context of the present disclosure, text (e.g., words) found in the corpus of comments 120 that are similar are clustered together, and these clusters 138 are shown in the dot visualization 200.

As shown in FIG. 2, cluster 138(P) includes a set of words including, for example, Word X, Word Y, and Word Z. Assume, for sake of illustration, that the words in cluster 138(P) are considered to be toxic words, and that the text moderation component 150 is configured to moderate (or filter out) toxic language before it is presented on one or more client machines 104. In the example of FIG. 2, an authorized user 146 may provide human labeling input 142 to the remote computing system 106. In particular, the authorized user 146 may have labeled Word X as a toxic word (e.g., using a class label: "toxic"). The remote computing system 106 may determine, based on this human labeling input 142, that Word X is within cluster 138(P). In other words, the remote computing system 106 may determine that a word(s) within cluster 138(P) is a particular type of word or speech; in this case, it determines that Word X is classified as toxic speech or a toxic word. With this information, the remote computing system 106 may identify, within the corpus of comments 120, a subset of comments 120 that include at least one word from cluster 138(P) (e.g., comments 120 that include one or more of Word X, Word Y, or Word Z), and the computing system 106 can label the corpus of comments 120 appropriately to create labeled comments. In this case, the computing system 106 may label comments 120 that are included in the identified subset with a first class label 202(1): toxic, while labeling the remaining comments 120 in the corpus of comments 120 with a second class label 202(2): non-toxic. FIG. 2 illustrates an example table showing comments 120(1)-(N) in the left column, identifiable by a comment ID 204, and class labels 202 assigned to those comments 120 in the right column, each comment 120 being assigned one of multiple class labels 202.

Figure 3A:
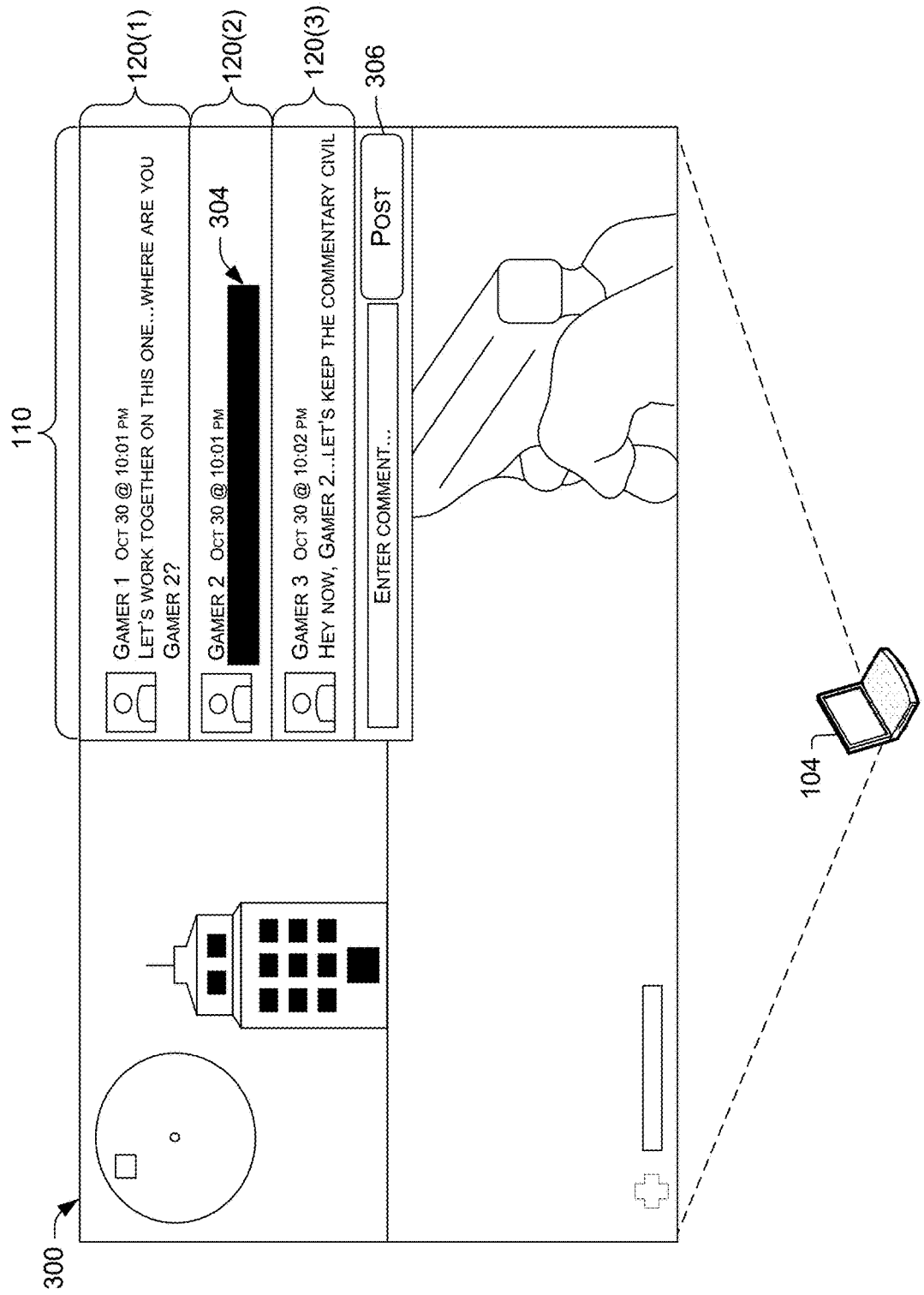
FIG. 3A illustrates an example graphical user interface (GUI) presented on a client machine, the GUI including a comment with moderated text.

FIG. 3A illustrates an example graphical user interface (GUI) 300 presented on a display of a client machine 104, the GUI 300 including a comment 120(2) with moderated text 304. The GUI 300 is shown by way of example, and not limitation, as an instance of a video game world that is output on the display of the client machine 104. For example, the GUI 300 may be rendered on the display of the client machine 104 while a user 102 of the client machine 104 is playing a video game executing on the client machine 104. In addition, an online discussion forum 110 may be presented within the GUI 300, thereby enabling the exchange of comments 120 between the user 102 of the client machine 104 and other users 102 who may be playing the same video game at the same time. This is commonly referred to as "in-game chat," where users 102 playing a common video game can communicate with each other, in real-time, via the in-game chat session. The in-game chat session depicted in FIG. 3A is one example type of online discussion forum 110 because it allows users 102 to participate in a discussion online. It is to be appreciated, however, that other types of online discussion forums 110 are contemplated herein, such as a message board where users 102 can post comments 120 for consumption by other users 102. In FIG. 3A, the online discussion forum 110 is rendered in the upper right corner of the display of the client machine 104, and it is rendered over the video game content. The window where the online discussion forum 110 is presented may be rendered with some level of transparency to allow the user 102 to see the portion of the video game content that is behind the window where the online discussion forum 110 is presented.

In the example of FIG. 3A, the user 102 of the client machine 104 is able to provide user input (e.g., to a keyboard) to compose a comment, and the user 102 may select a control element (e.g., the "Post" soft button) to cause the comment to be sent to the remote computing system 106 for classification. The online discussion forum 110 is shown as including multiple comments 120(1)-(3) that have been classified by the text classifier 128, and presented on the display of the client machine 104. These individual comments 120 may have been composed by other users 102. In this example, "Gamer 2" is a different user than the user 102 of the client machine 104, and Gamer 2 has posted a comment 120(2) that includes text 304 that was classified as text to be moderated. For example, the text 304 of the comment 120(2) may include toxic language, and, as a result, the text classifier 128 will have classified the text 304 of the comment 120(2) as a particular class label: toxic. The text moderation component 150 moderates this text 304 based on its classification so that the user 102 of the client machine 104 is not subjected to the toxic language in the comment 120(2). Here, the moderation of the text 304 involves concealing the text 304 by rendering an opaque color over the text 304, but other text moderation techniques, such as those discussed elsewhere herein, can be implemented.

Figure 3B:
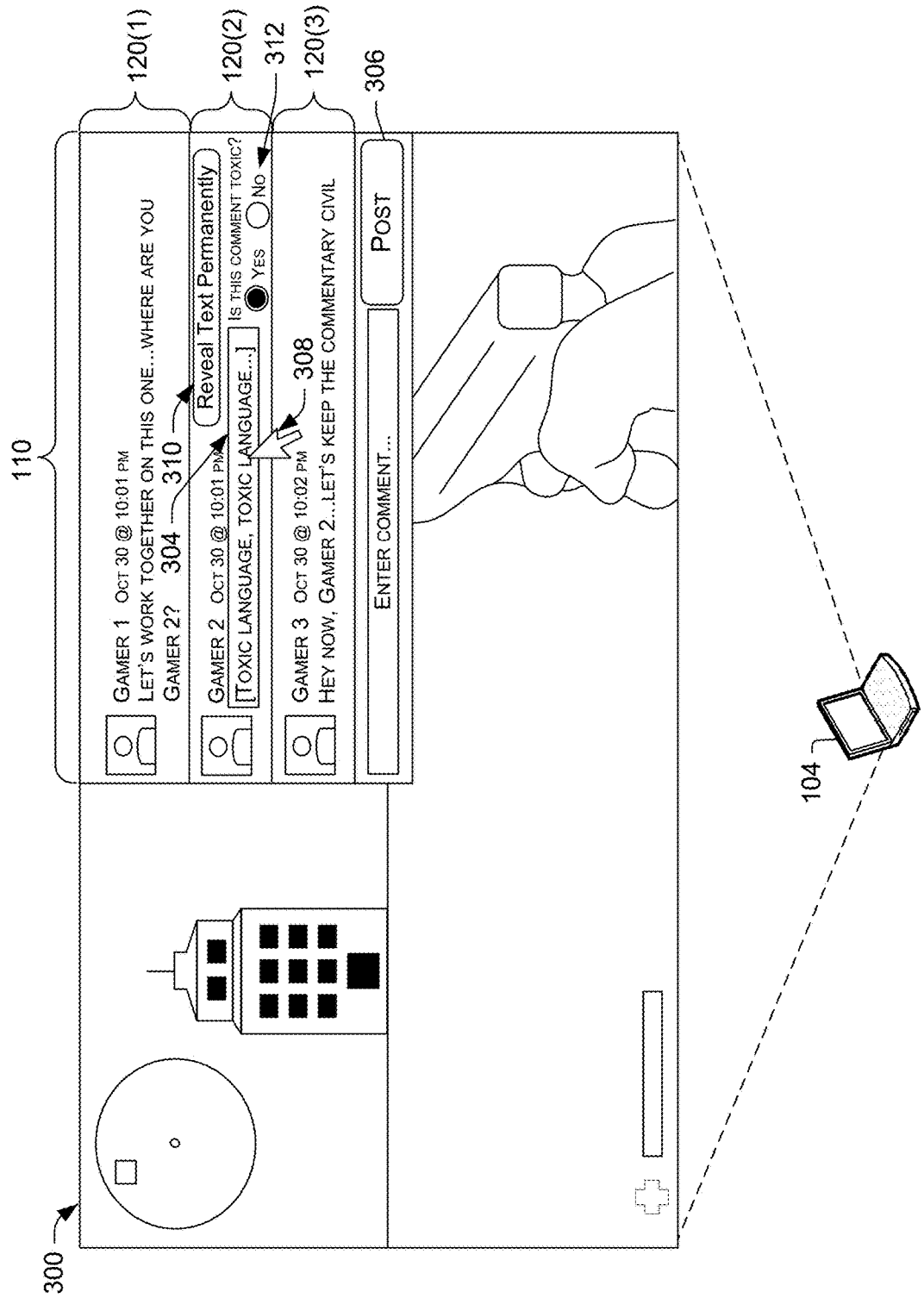
FIG. 3B illustrates the example GUI of FIG. 3A at a time when a user has provided user input with respect to the moderated text, causing the text to be temporarily revealed on the display.

FIG. 3B illustrates the example GUI 300 of FIG. 3A at a time when a user 102 has provided user input with respect to the moderated text 304, causing the text 304 to be temporarily revealed on the display of the client machine 104. In the example of FIG. 3B, the user 102 has provided user input in the form of a mouseover event, which involves moving a pointer 308 over (or "hovering" the pointer 308 over) the moderated text 304 of the comment 120(2). In response to this user input, the client machine 104 may send, to the remote computing system 106, an indication that the user 102 has requested to view the text 304 of the comment 120(2). The remote system 106, in response to receiving this indication, may cause (e.g., by sending instructions to the client machine 104) the text 304 of the comment 120(2) to be temporarily revealed on the display of the client machine 104. In FIG. 3B, this text 304 is shown as "Toxic Language, Toxic Language . . . " to imply that Gamer 2 has typed a comment 120(2) that contains toxic language, which may be offensive to the user 102 of the client machine 104. Again, this type of text moderation may be done for all users, or it may be a purely opt-in program where users opt-in if they would like certain types/classes of text to be moderated. Even when the remote system 106 moderates text for the user 102, the user 102 can choose whether or not they want to temporarily reveal the moderated text 304 of the comment 120(2). A user 102 may choose to temporarily reveal moderated text 304 to provide feedback to the remote system 106, or if they suspect that the comment 120(2) may have been unnecessarily moderated. The moderated text 304 may be "temporarily" revealed in the sense that the text 304 may revert to being moderated (e.g., concealed) in response to the user 102 ceasing to provide the user input (e.g., when the user 102 stops hovering the pointer 308 over the moderated text 304, or otherwise moves the pointer 308 away from the moderated text 304).

In response to temporarily revealing the moderated text 304, the text presenter 130 of the remote computing system 106 may cause presentation of a control element 310 (e.g., a soft button "Reveal Text Permanently"). This example control element 310 in FIG. 3B indicates that selection of the control element 310 will reveal the moderated text 304 permanently so that it is no longer moderated. Accordingly, if the remote system 106 receives, from the client machine 104, an indication that the control element 310 has been selected, the text presenter 130, via the text moderation component 150, may cause the text 304 of the comment 120(2) to be permanently revealed on the display of the client machine 104, at least while the comment 120(2) is presented on the display of the client machine 104.

Furthermore, in response to temporarily revealing the moderated text 304, the text presenter 130 of the remote computing system 106 may cause presentation of a feedback element 312 on the display of the client machine 104. This feedback element 312 is shown, by way of example in FIG. 3B, as radio buttons, one of which is selectable to provide user feedback in response to a question posed to the user 102. For example, the feedback element 312 may ask the user 102 if the comment 120(2) with the temporarily revealed text is in fact toxic (from the user's perspective). The user 102 may provide a "Yes" or "No" answer to this feedback question by selecting one of the radio buttons. In the example of FIG. 3B, the user 102 selected the "Yes" radio button, and, in response, the remote system 106 receives, from the client machine 104, the user feedback indicating that the user 102 considers the comment 120(2) to be classified as the class label: toxic. Based on receiving this user feedback, the training component 126 may retrain the machine learning model(s) 148 of the text classifier 148. It is to be appreciated that, in order to retrain the machine learning model(s) 148, the training component 126 may utilize more than just user feedback from a single user. Accordingly, many different users 102 may provide user feedback via respective feedback elements 312 that are presented on their respective client machines 104, and this user feedback can be aggregated and used as training data for retraining the machine learning model(s) 148 to classify text as one of multiple class labels.

Figure 3C:
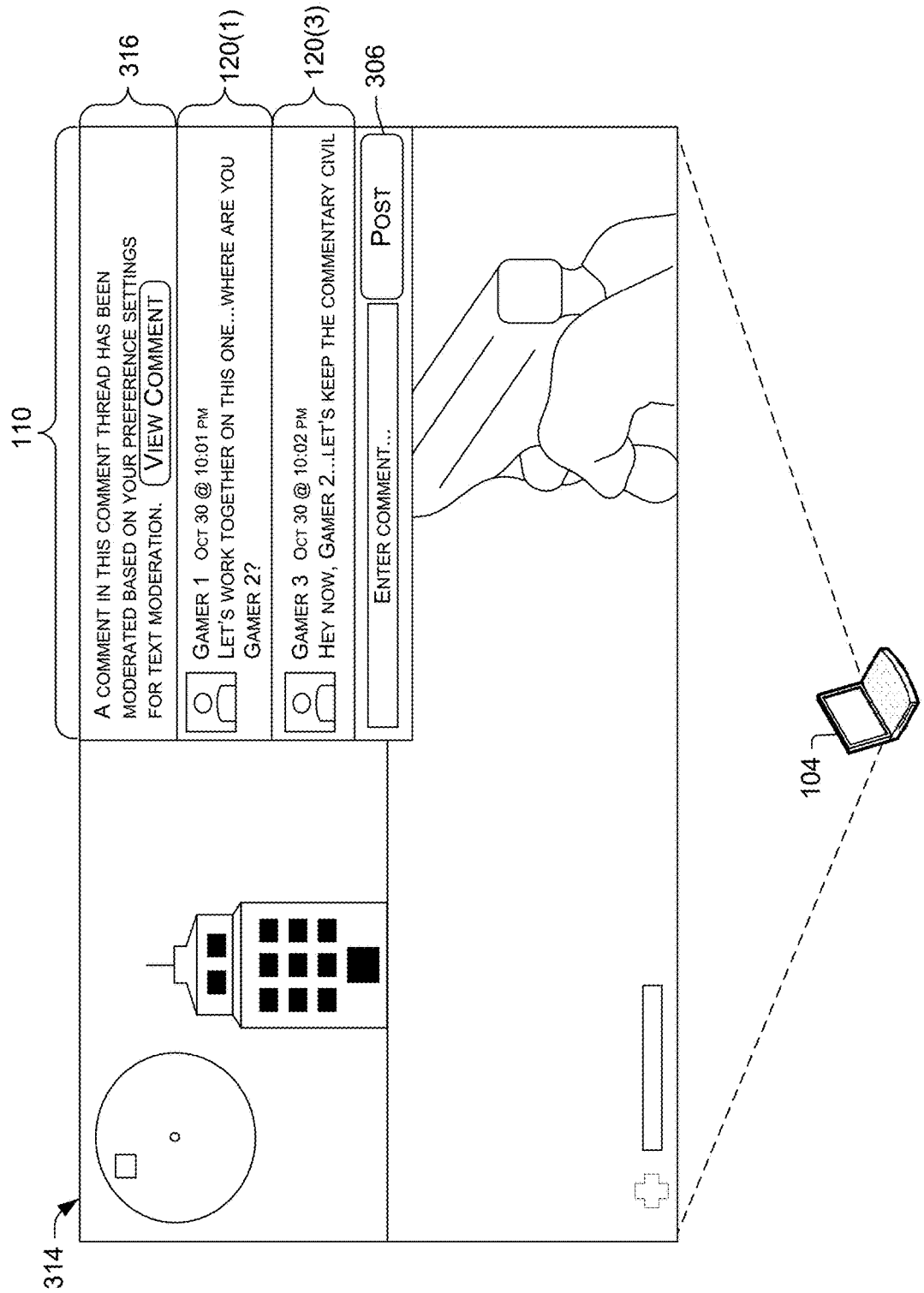
FIG. 3C illustrates another example GUI presented on a client machine, the GUI indicating that text has been moderated and providing an option for a user to view the moderated text.

FIG. 3C illustrates another example GUI 314 presented on a client machine 104, the GUI indicating that text has been moderated and providing an option for a user to view the moderated text. In this example, instead of presenting the comment 120(2) that includes the moderated text, the text moderation involves refraining from presenting the comment 120(2) with the moderated text altogether. In this scenario, the text presenter 130 may cause presentation of a message, as shown in area 316 of the online discussion forum 110, the message informing the user 102 that text has been moderated, and providing the user 102 with an option to provide user input to a "View Comment" soft button to request to view the moderated text. In the event that the user 102 selects the "View Comment" soft button in area 316 of FIG. 3C, the moderated text may be temporarily revealed.

For example, the GUI 314 may transition to something along the lines of the GUI 300 shown in FIG. 3B, where the moderated text 304 is revealed to the user, and a control element 310 and/or a feedback element 312 is presented on the display, as described with reference to FIG. 3B.

Figure 4:
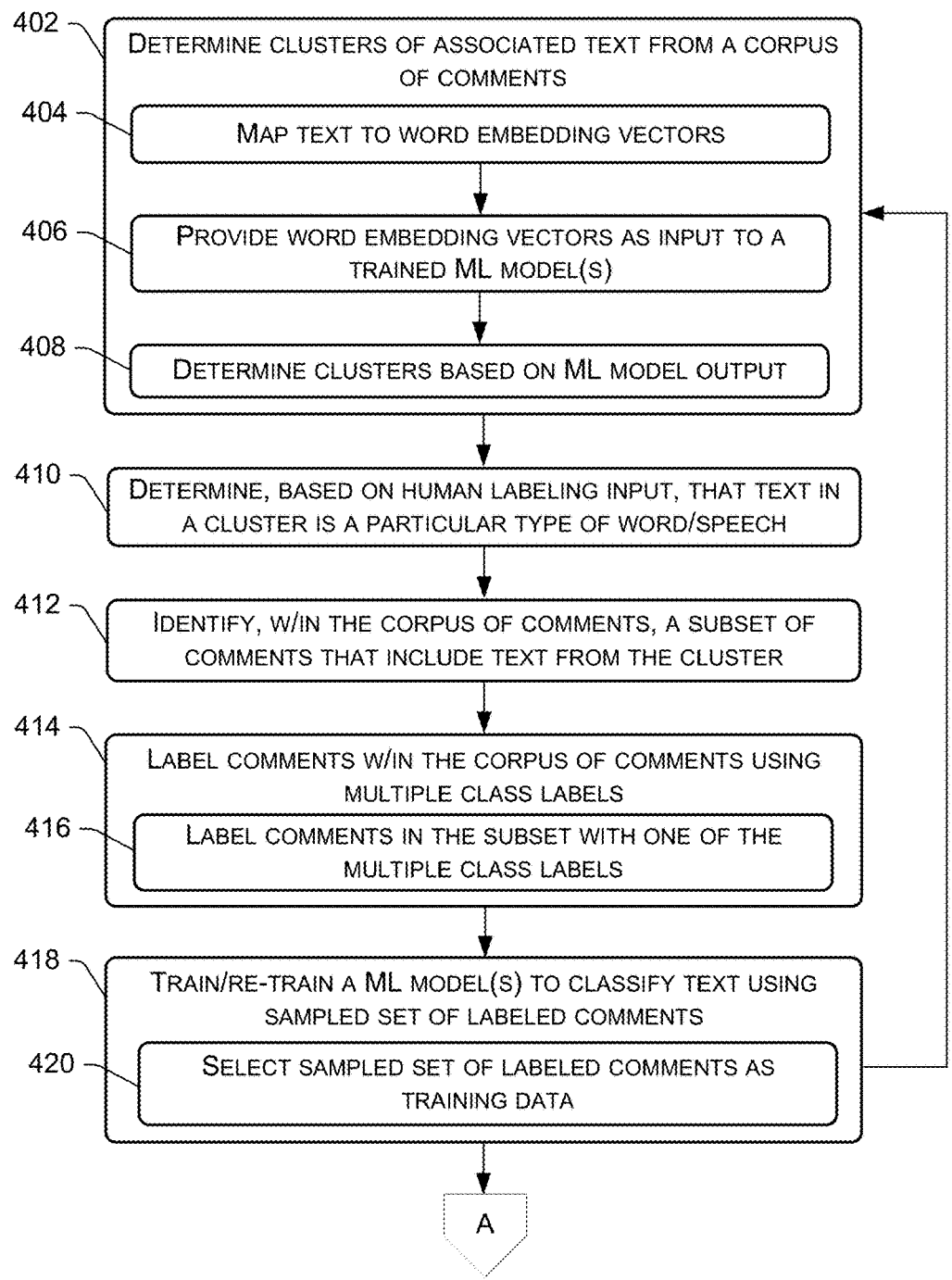
FIG. 4 is a flow diagram of an example process for training a machine learning model(s) to classify text based on a word embedding generated from a corpus of comments.

The processes described herein are illustrated as a collection of blocks in a logical flow graph, which represent a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes FIG. 4 is a flow diagram of an example process 400 for training a machine learning model(s) 148 to classify text based on a word embedding generated from a corpus of comments 120. For discussion purposes, the process 400 is described with reference to the previous figures.

At 402, the word embedding component 122 of the remote computing system 106 may determine, based at least in part on word embedding vectors 134, clusters of associated text 138 from a corpus of comments 120. The clusters of associated text 138 may be clusters of associated words 138. The determining of the clusters 138 at block 402 may include sub-operations, as shown by sub-blocks 404-406.

At 404, the word embedding component 122 may map (or otherwise associate) text within the corpus of comments 120 to the word embedding vectors 134. In some embodiments, the mapping at block 404 includes mapping individual words from the corpus of comments 120 to the word embedding vectors 134. At 406, the word embedding component 122 may provide the word embedding vectors 134 as input to a first trained machine learning model(s) 136. At 408, the word embedding component 122 may determine clusters of associated text (e.g., words) 138 based at least in part on output from the first trained machine learning model(s) 136.

At 410, the labeling component 124 of the remote computing system 106 may determine, based on human labeling input 142, that a portion of text (e.g., one or more words) within a cluster of associated text 138 is a particular type of word or speech. For example, the human labeling input 142 may indicate that a word within a given cluster is a toxic word, hate speech, and/or profanity.

At 412, the labeling component 124 may identify, within the corpus of comments 120, a subset of comments that include text (e.g., at least one word) from the cluster of associated text 138 (e.g., the cluster of associated words 138). In other words, the labeling component 124 can identify comments 120 that contain the particular type of word or speech because the labeling component 124 searches for comments 120 that contain the human-labeled word, or any word that is clustered with that human-labeled word according to the word embedding.

At 414, the labeling component 124 may label comments 120 within the corpus of comments 120 to create labeled comments. As shown by sub-block 416, this labeling at block 414 may include labeling comments 120 included in the identified subset of comments with one of multiple class labels, such as a first class label: toxic.

At 418, the training component 126 may train a machine learning model using a sampled set of the labeled comments as training data to obtain a second trained machine learning model(s) 148. In this manner, the second trained machine learning model(s) 148 is configured to classify text (e.g., comments containing text) using the multiple class labels. As shown by sub-block 420, this training at block 418 may include selecting the sampled set of labeled comments, from the corpus of labeled comments, as training data. Any suitable selection algorithm may be utilized for this purpose. As shown by the return arrow from block 418 to block 402, the process 400 may iterate for purposes of retraining the machine learning model(s) 148. This retraining may occur when new comments 120 are added to the corpus of comments, in periodic intervals, whenever new word embeddings are created based on the updated corpus of comments 120, or based on any other suitable criteria.

Figure 5:
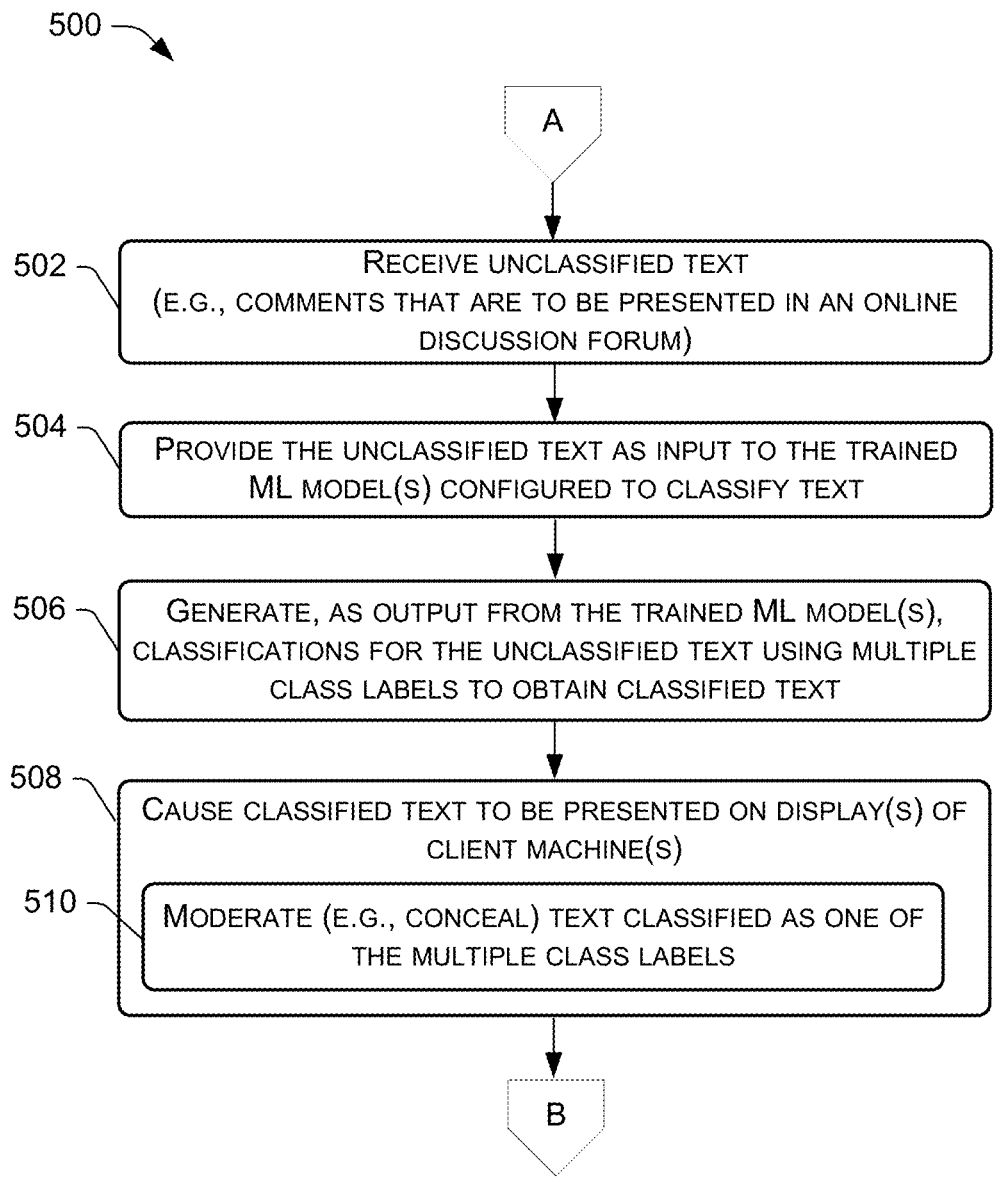
FIG. 5 is a flow diagram of an example process for utilizing a trained machine learning model(s) to classify text and to moderate text, as appropriate, before it is presented on a client machine(s).

FIG. 5 is a flow diagram of an example process 500 for utilizing a trained machine learning model(s) 148 to classify text and for moderating text, as appropriate, before it is presented on a client machine(s) 104. For discussion purposes, the process 500 is described with reference to the previous figures. Furthermore, as indicated by the off-page reference "A" in FIGS. 4 and 5, the process 500 may continue from block 418 of the process 400, after the machine learning model(s) 148 is trained to classify text as one of multiple class labels.

At 502, the remote computing system 106 may receive, from one or more client machines 104, unclassified text that is to be presented on a display(s) of a client machine(s) 104, the unclassified text being user-generated text. For example, the unclassified text may be one or more unclassified comments 120, authored and posted by one or more users 102, and the remote system 106 may be tasked with presenting the comment(s) 120 in an online discussion forum 110. In some embodiments, the received text is to be sent in one or more messages to one or more other users 102 who are participating in the online discussion forum 110 (e.g., a chat session, a message board, etc.).

At 504, the text classifier 128 of the remote system 106 may provide the unclassified text as input to the (second) trained machine learning model(s) 148. The unclassified text may be unclassified comment(s) 120 containing text.

At 506, the text classifier 128 may generate, as output from the trained machine learning model(s) 148, a classification of the unclassified text (e.g., the unclassified comment(s) 120 containing text) as one of multiple class labels to obtain classified text (e.g., one or more classified comments 120). For example, the classified text may include a classification of a particular comment 120 as a first class label that corresponds to a type of speech to be moderated (e.g., toxic speech, hate speech, and/or profanity). In some embodiments, the text classification is output from the trained machine learning model(s) 148 as a score relating to a probability of the text being (or the comment(s) 120 including) a particular type of word or speech, and the text may be classified as a particular class label based at least in part on the score meeting or exceeding a threshold score.

At 508, the text presenter 130 of the remote computing system 106 may cause presentation of the classified text (e.g., the classified comment(s) 120 containing text) on a display(s) of a client machine(s) 104. As shown by sub-block 510, the text moderation component 150 of the remote computing system 106 may moderate text of any classified comment(s) 120 classified as a particular class label that is to be moderated. For example, for text classified as a first class label corresponding to toxic language, hate speech, or profanity, that text may be moderated. In some embodiments, the moderation of the text at block 510 may include concealing the moderated text on the display(s) of the client machine(s) 104, such as by blurring the text of a particular comment 120 to render the text illegible/unreadable, or rendering an opaque color over the text to conceal the text. In some embodiments, the presentation of the classified text at block 508 involves presenting the classified text (e.g., classified comment(s) 120 containing text) in an online discussion forum 110, such as an in-game chat session of a video game executing on the client machine(s) 104, or a community message board associated with a video game services platform. In this manner, moderated text may be presented with text that is not moderated. For example, a comment including moderated text may be presented with additional classified comments that were not classified as the same class label as a comment with the moderated text. In some embodiments, moderating the text at block 510 includes refraining from presenting the moderated text (e.g., by refraining from sending text data to the client machine 104 in the first place).

Figure 6:
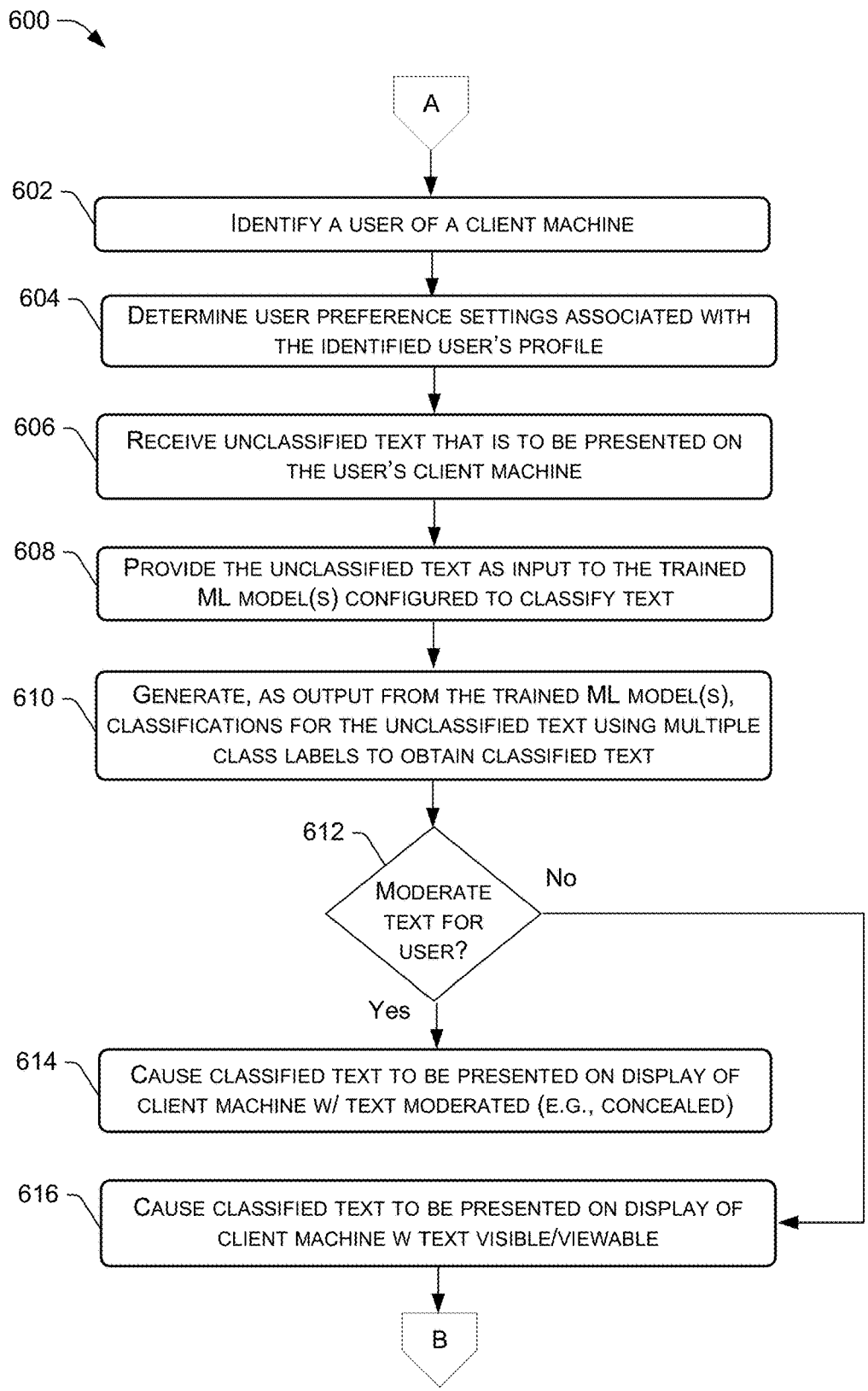
FIG. 6 is a flow diagram of an example process for moderating text for an identified user, as appropriate, based on user preference settings of the identified user.

FIG. 6 is a flow diagram of an example process 600 for moderating text for an identified user, as appropriate, based on user preference settings of the identified user. For discussion purposes, the process 600 is described with reference to the previous figures. Furthermore, as indicated by the off-page reference "A" in FIGS. 4 and 6, the process 600 may continue from block 418 of the process 400, after the machine learning model(s) 148 is trained to classify text as one of multiple class labels.

At 602, the user ID component 132 of the remote computing system 106 may identify a user 102 of a client machine 104. For example, the user 102 may have logged into the video game service 118 of the remote system 106 using credentials, and/or launched a client application that automatically logs the user 102 into the service.

At 604, user preference settings of a user profile 154 associated with the identified user 102 may be determined. These user preference settings may indicate a type/class of speech that the user 102 does not wish to see while using the video game service 118 of the remote system 106. For example, the user 102 may wish to avoid seeing hate speech, and, as such, the user 102 may have specified in his/her user preference settings that hate speech is a class label corresponding to a type of speech the user does not wish to see in text (e.g., in user-generated comments 120 from other users).

At 606, the remote computing system 106 may receive, from one or more client machines 104, unclassified text that is to be presented on a display of the identified user's 102 client machine 104, the unclassified text being user-generated text. For example, the unclassified text may be one or more unclassified comments 120, authored and posted by one or more users 102.

At 608, the text classifier 128 of the remote system 106 may provide the unclassified text as input to the (second) trained machine learning model(s) 148. This may involve providing unclassified comment(s) 120 containing text as input to the trained machine learning model(s) 148.

At 610, the text classifier 128 may generate, as output from the trained machine learning model(s) 148, a classification of the unclassified text (e.g., the unclassified comment(s) 120 containing text) as one of multiple class labels to obtain classified text (e.g., one or more classified comments 120). For example, the classified comments 120 may include a classification of a particular comment 120 as a first class label that corresponds to a particular type of speech (e.g., hate speech). In some embodiments, the classification of the text (e.g., the comment(s) 120 containing text) is output from the trained machine learning model(s) 148 as a score relating to a probability of the text being (or the comment(s) 120 including) a particular type of word or speech, and the text may be classified as a particular class label based at least in part on the score meeting or exceeding a threshold score.

At 612, the text moderation component 150 may determine, based on the user preference settings determined at block 604 for the identified user, whether to moderate text (e.g., text of a comment 120) classified as a particular class label. For example, if a first class label corresponds to hate speech, and the user preference settings for the identified user 102 specify that the user 102 does not want to see hate speech, the determination at block 612 is in the affirmative, and the process 600 may follow the "YES" route from block 612 to block 614, where the text moderation component 150 can moderate the text classified as the first class label in accordance with the user preference settings (e.g., text classified as hate speech).

If, at 612, the text moderation component 150 determines, based on the user preference settings, that the text is not classified as the class label that is to be moderated in accordance with the user preference settings (e.g., if the text is not hate speech), the process 600 may follow the "NO" route from block 612 to block 616, where the text is presented on the display of the identified user's 102 client machine 104 without moderating the text, thereby making the text visible (or viewable) to the identified user 102.

Figure 7:
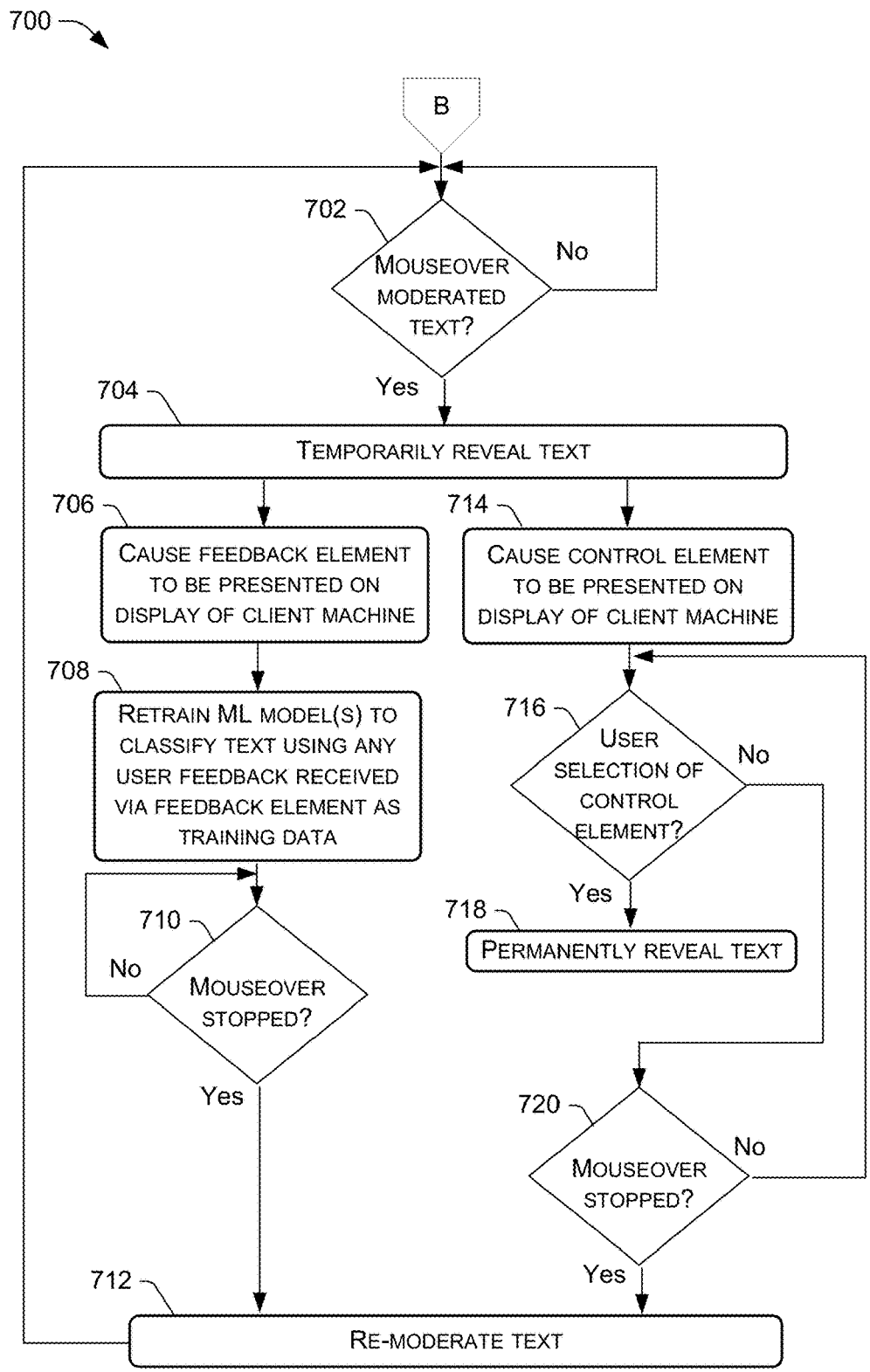
FIG. 7 is a flow diagram of an example process for allowing a user to temporarily reveal moderated text, to provide user feedback regarding the remote system's classification of that moderated text, and/or to permanently reveal the text on the display of the user's client machine.

FIG. 7 is a flow diagram of an example process 700 for allowing a user to temporarily reveal moderated text, to provide user feedback regarding the remote system's classification of that moderated text, and/or to permanently reveal the text on the display of the user's client machine. For discussion purposes, the process 700 is described with reference to the previous figures. Furthermore, as indicated by the off-page reference "B" in FIGS. 5, 6, and 7, the process 700 may continue from block 508 of the process 500, or from block 616 of the process 600, after text has been presented on a display of a client machine with at least some of the text being moderated.

At 702, the text moderation component 150 of the remote computing system 106 may determine whether user input (e.g., a mouseover event) has been received at a client machine 104 of a user 102 indicating that the user 102 has requested to view moderated text (e.g., text of a comment 120). Such an indication at 702 may be a mouseover event, such as the example shown in FIG. 3B where a pointer 308 is moved over ("hovering") the moderated text 304, or the user's selection of a "View Comment" soft button, as shown in FIG. 3C. If, at 702, the remote system 106 does not receive any indication from any client machine 104 that the user has requested to view the moderated text, the process 700 may follow the "NO" route from block 702 by iterating the determination at block 702. At some point, the remote system 106 may receive, from a client machine 104, an indication that a user 102 of the client machine 104 has requested to view moderated text, and the process 700 may follow the "YES" route from block 702 to block 704.

At 704, in response to the receiving of the indication at block 702, the text moderation component 150 may cause the moderated text 304 (e.g., moderated text of a particular comment 120(2)) to be temporarily revealed on the display of the client machine 104. Again, "temporarily" revealing the moderated text may include revealing (or presenting) the text so long as the user continues to provide user input indicating that the user is requesting to view the moderated text (e.g., whilst the pointer 308 continues to hover over the moderated text 304).

At 706, in response to causing the moderated text to be temporarily revealed at block 704, the remote system 106 may cause presentation of a feedback element 312 on the display of the client machine 104. At 708, if user feedback is received via the feedback element 312, the training component 126 may use that user feedback (perhaps with other user feedback obtained from other users) to retrain the machine learning model(s) 148. This retraining results in a newly-trained machine learning model(s) 148 that is configured to classify text (e.g., comments containing text) using multiple class labels. For example, the user feedback received via the feedback element 312 at block 708 may indicate whether the user 102 considers the moderated text (e.g., the comment containing the moderated text) to be classified as a particular class label. That is, the user may be asked to indicate whether they believe moderated text is classified as a particular type of speech (e.g., toxic speech, hate speech, profanity, etc.), and this user feedback may be treated (in aggregation with other user feedback) as training data usable to retrain the machine learning model(s) 148 for text classification.

At 710, the text moderation component 150 may determine whether the user input (e.g., the mouseover event) detected at block 702 has ceased or stopped. If the user input (e.g., the mouseover) does not cease, the process 700 may follow the "NO" route from block 710 to iterate the determination at block 710 until the user input ceases. Upon receiving an indication from the client machine 104 that the user input requesting to reveal the moderated text has ceased, the process 700 may follow the "YES" route from block 710 to block 712, where the text is once again moderated, and the process 700 iterates by returning to block 702. In this fashion, a user 102 can hover a pointer 308 over moderated text in order to temporarily reveal the moderated text, which then returns to its moderated state once the user moves the pointer 308 away from the moderated text.

At 714, in response to causing the moderated text to be temporarily revealed at block 704, the remote system 106 may cause presentation of a control element 310 on the display of the client machine 104. At 716, a determination is made as to whether the user has selected the control element 310. If so, the remote computing system 106 receives an indication from the client machine 104 that the control element 310 has been selected, and the process 700 may follow the "YES" route from block 716 to block 718, where the text moderation component 150 causes the moderated text to be permanently revealed on the display of the client machine 104, at least while the text (e.g., the comment containing the text) is presented on the display of the client machine 104.

If, at 716, the remote system 106 does not receive an indication from the client machine 104 that the control element 310 has been selected, the process 700 may follow the "NO" route from block 716 to block 720, where the text moderation component 150 may determine whether the user input (e.g., the mouseover event) detected at block 702 has ceased or stopped. If the user input (e.g., the mouseover) persists, the process 700 may follow the "NO" route from block 720 to iterate the determination at block 716 as to whether the control element 310 has been selected. Assuming that the control element 310 is still not selected, and in response to the user input requesting to reveal the moderated text ceasing, the process 700 may follow the "YES" route from block 720 to block 712, where the text is again moderated, and the process 700 iterates by returning to block 702.

Although text moderation is discussed herein as the primary example of how text classification can be used, it is to be appreciated that other insights may be gleaned from the clusters of associated words 138 created by the word embedding process described herein. For example, a recommendation engine may analyze text associated with user profiles 154 of users 102 to determine if products (e.g., video games) can be recommended to users 102 based on the clusters of associated words 138. For example, a given cluster 138 may include the name of a popular video game grouped with other words, which may include names of other video games. For example, users who mention a first video game in comments 120 may also discuss other video game that are of interest, and, if the corpus of comments 120 includes these types of comments that discuss video games and aspects thereof, the clusters 138 will determine that certain video game terms are associated with other video game terms, which allows a recommendation engine to create a mapping between video games in a video game library or catalogue. Accordingly, when the recommendation engine determines, from user account data 152, that a particular user 102 is interested in a first video game, the recommendation engine can recommend a different video game to the user 102, which the recommendation engine determined using the clusters of associated words 138.

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. A system comprising:
   one or more processors; and
   memory storing computer-executable instructions that, when executed by the one or more processors, cause the system to:
   provide, as input to a trained machine learning model, an unclassified comment that is to be presented on a display of a client machine;
   generate, as output from the trained machine learning model, a classification of the unclassified comment to obtain a classified comment;
   cause presentation of the classified comment on the display of the client machine with text of the classified comment concealed on the display of the client machine;
   receive, from the client machine, an indication that a user of the client machine has requested to view the text of the classified comment;
   in response to receiving the indication, cause the text of the classified comment to be temporarily revealed on the display of the client machine; and
   receive, from the client machine, at least one of:
      user feedback that is usable to retrain the trained machine learning model; or
      an indication that the user has selected a control element to permanently reveal the text of the classified comment on the display of the client machine.

2. The system claim 1, wherein the computer-executable instructions, when executed by the one or more processors, further cause the system to:
   identify the user of the client machine; and
   determine user preference settings of a user profile associated with the user, the user preference settings indicating that the user does not want to see comments classified as a first class label,
   wherein the text of the classified comment is concealed on the display of the client machine based at least in part on the user preference settings of the user profile.

3. The system of claim 1, wherein causing the presentation of the classified comment on the display of the client machine comprises causing the presentation of the classified comment in an online discussion forum along with additional classified comments.

4. The system of claim 3, wherein the online discussion forum comprises at least one of:
   an in-game chat session of a video game executing on the client machine; or
   a community message board associated with a video game services platform.

5. The system of claim 1, wherein the unclassified comment is classified as a first class label that corresponds to at least one of toxic language, hate speech, or profanity.

6. A method comprising:
   providing, as input to a trained machine learning model, unclassified text that is to be presented on a display of a client machine;
   generating, as output from the trained machine learning model, a classification of the unclassified text to obtain classified text;
   moderating the classified text;
   receiving, from the client machine, an indication that a user of the client machine has requested to view the classified text;
   in response to the receiving of the indication, causing the classified text to be temporarily revealed on the display of the client machine; and
   receiving, from the client machine, at least one of:
      user feedback that is usable to retrain the trained machine learning model; or
      an indication that the user has selected a control element to permanently reveal the classified text on the display of the client machine.

7. The method of claim 6, wherein the trained machine learning model is a second trained machine learning model, the method further comprising:
   mapping, by a computing system, text within a corpus of comments to word embedding vectors;
   providing the word embedding vectors as input to a first trained machine learning model;
   determining clusters of associated text that appear within the corpus of comments based at least in part on output from the first trained machine learning model; and
   training a second machine learning model using a sampled set of labeled comments within the corpus of comments to obtain the second trained machine learning model.

8. The method of claim 6, further comprising:
   identifying the user of the client machine; and
   determining user preference settings of a user profile associated with the user, the user preference settings indicating that the user does not want to see text classified as a first class label,
   wherein the classified text is moderated based at least in part on the user preference settings of the user profile.

9. The method of claim 6, wherein the moderating the classified text comprises concealing the classified text as concealed text on the display of the client machine, and wherein the concealed text is presented as part of at least one of:
　　an in-game chat session of a video game executing on the client machine; or
　　a community message board associated with a video game services platform.

10. The method of claim 6, wherein the unclassified text is classified as a first class label that corresponds to at least one of toxic language, hate speech, or profanity.

11. The method of claim 6, further comprising:
　　labeling comments within a corpus of comments with a first class label of multiple class labels to create labeled comments; and
　　training a machine learning model using a sampled set of the labeled comments to obtain the trained machine learning model.

12. The method of claim 11, further comprising:
　　determining, based at least in part on word embedding vectors, clusters of associated text that appear within the corpus of comments;
　　determining, based on human labeling input, that a portion of text within a cluster of associated text is a particular type of word or speech; and
　　identifying, within the corpus of comments, a subset of comments that include text from the cluster of associated text,
　　wherein the labeled comments correspond to the subset of comments.

13. The system claim 1, wherein the computer-executable instructions, when executed by the one or more processors, further cause the system to:
　　label comments within a corpus of comments with a first class label of multiple class labels to create labeled comments;
　　train a machine learning model using a sampled set of the labeled comments to obtain the trained machine learning model.

14. The system claim 13, wherein the computer-executable instructions, when executed by the one or more processors, further cause the system to:
　　determine, based at least in part on word embedding vectors, clusters of associated text from the corpus of comments;
　　determine, based on human labeling input, that a portion of text within a cluster of associated text is a particular type of word or speech;
　　identify, within the corpus of comments, a subset of comments that include text from the cluster of associated text;
　　wherein the labeled comments correspond to the subset of comments.

15. One or more non-transitory computer-readable media storing computer-executable instructions that, when executed by a processor, cause performance of operations comprising:
　　providing, as input to a trained machine learning model, unclassified text that is to be presented on a display of a client machine;
　　generating, as output from the trained machine learning model, a classification of the unclassified text to obtain classified text;
　　moderating the classified text;
　　receiving, from the client machine, an indication that a user of the client machine has requested to view the classified text;
　　in response to the receiving of the indication, causing the classified text to be temporarily revealed on the display of the client machine; and
　　receiving, from the client machine, at least one of:
　　　　user feedback that is usable to retrain the trained machine learning model; or
　　　　an indication that the user has selected a control element to permanently reveal the classified text on the display of the client machine.

16. The one or more non-transitory computer-readable media of claim 15, the operations further comprising:
　　identifying the user of the client machine; and
　　determining user preference settings of a user profile associated with the user, the user preference settings indicating that the user does not want to see text classified as a first class label,
　　wherein the classified text is moderated based at least in part on the user preference settings of the user profile.

17. The one or more non-transitory computer-readable media of claim 15, wherein the moderating the classified text comprises concealing the classified text as concealed text on the display of the client machine, and wherein the concealed text is presented as part of at least one of:
　　an in-game chat session of a video game executing on the client machine; or
　　a community message board associated with a video game services platform.

18. The one or more non-transitory computer-readable media of claim 15, wherein the unclassified text is classified as a first class label that corresponds to at least one of toxic language, hate speech, or profanity.

19. The one or more non-transitory computer-readable media of claim 15, the operations further comprising:
　　labeling comments within a corpus of comments with a first class label of multiple class labels to create labeled comments; and
　　training a machine learning model using a sampled set of the labeled comments to obtain the trained machine learning model.

20. One or more non-transitory computer-readable media of claim 19, the operations further comprising:
　　determining, based at least in part on word embedding vectors, clusters of associated text that appear within the corpus of comments;
　　determining, based on human labeling input, that a portion of text within a cluster of associated text is a particular type of word or speech; and
　　identifying, within the corpus of comments, a subset of comments that include text from the cluster of associated text,
　　wherein the labeled comments correspond to the subset of comments.

* * * * *